US010293557B2

(12) United States Patent
Cerezo Arce et al.

(10) Patent No.: US 10,293,557 B2
(45) Date of Patent: May 21, 2019

(54) METHOD, FORMING AND INJECTION TOOL FOR MANUFACTURING AN APERTURE SURROUNDING FRAME FOR AN AIRCRAFT FUSELAGE, AND FRAME OBTAINED THEREOF (71) Applicant: Airbus Operations, S.L., Madrid (ES)

(72) Inventors: David Alfonso Cerezo Arce, Madrid (ES); Melania Sanchez Perez, Madrid (ES); Alvaro Calero Casanova, Madrid (ES)

(73) Assignee: Airbus Operations, S.L., Madrid (ES)

(*) Notice: Subject to any disclaimer, the term of this patent is extended or adjusted under 35 U.S.C. 154(b) by 314 days.

(21) Appl. No.: 15/343,788

(22) Filed: Nov. 4, 2016

(65) Prior Publication Data
US 2017/0129191 A1 May 11, 2017

(30) Foreign Application Priority Data

Nov. 5, 2015 (EP) .................... 15382543

(51) Int. Cl.
B29C 70/34 (2006.01)
B29C 33/42 (2006.01)
(Continued)

(52) U.S. Cl.
CPC ............ *B29C 70/342* (2013.01); *B29C 33/42* (2013.01); *B29C 45/26* (2013.01); *B29C 70/222* (2013.01);
(Continued)

(58) Field of Classification Search
CPC ......... Y02T 50/43; B29C 33/42; B29C 45/26; B29C 70/342; B29C 70/48; B29C 70/446;
(Continued)

(56) References Cited

U.S. PATENT DOCUMENTS

| 5,525,035 A | 6/1996 | Ben-Porat et al. |
| 6,406,580 B1 | 6/2002 | Campbell, Jr. |
| 2012/0073136 A1 | 3/2012 | Denk et al. |

FOREIGN PATENT DOCUMENTS

| FR | 2988324 A1 * | 9/2013 | ........... B29C 53/086 |
| FR | 2988324 A1 | 9/2013 | |
| GB | 2460741 A | 12/2009 | |

OTHER PUBLICATIONS

Machine translation of FR 2988324 A1 (Year: 2012).*
European Search Report dated Jul. 6, 2016 in European Patent Application No. 15382543.5 (thirteen pages).

* cited by examiner

Primary Examiner — Vishal I Patel
(74) Attorney, Agent, or Firm — John S. Artz; Dickinson Wright PLLC (57) ABSTRACT The present disclosure refers to the manufacturing process of an aperture surrounding frame for an aircraft fuselage. The method includes providing a tubular braiding material (2) with a perimeter equal to the perimeter of the frame to be manufactured, cutting the tubular braiding material (2) to obtain annular-shaped braiding slices (3), providing an annular-shaped inner mold (4) where the annular-shaped inner mold has a surface with a desired shape for the aperture surrounding frame, layering up at least one braiding slice (3) around the inner mold (4), forming the at least one braiding slice (3) around the inner mold (4), and curing the aperture surrounding frame pre-form. The present disclosure also refers to an aperture surrounding frame (1) for an aircraft fuselage formed as a continuous body by at least one annular-shaped braiding slice (3) with a perimeter equal to the perimeter of the desired aperture surrounding frame.

10 Claims, 5 Drawing Sheets (51) Int. Cl.

| | |
|---|---|
| *B29C 45/26* | (2006.01) |
| *B29C 70/48* | (2006.01) |
| *B29C 70/44* | (2006.01) |
| *B29C 70/46* | (2006.01) |
| *B29C 70/22* | (2006.01) |
| *B64C 1/14* | (2006.01) |
| B29K 105/08 | (2006.01) |
| B29K 307/04 | (2006.01) |
| B29L 31/30 | (2006.01) |
| B29L 31/00 | (2006.01) |

(52) U.S. Cl.
CPC .......... *B29C 70/446* (2013.01); *B29C 70/462* (2013.01); *B29C 70/48* (2013.01); *B64C 1/1461* (2013.01); *B64C 1/1492* (2013.01); B29K 2105/08 (2013.01); B29K 2307/04 (2013.01); B29L 2031/005 (2013.01); B29L 2031/3082 (2013.01); B29L 2031/7096 (2013.01); Y02T 50/43 (2013.01)

(58) Field of Classification Search
CPC . B29C 70/462; B29C 70/222; B29K 2105/08; B29K 2307/04; B29L 2031/3082; B29L 2031/005; B29L 2031/7096; B64C 1/1461; B64C 1/1492
See application file for complete search history.

METHOD, FORMING AND INJECTION TOOL FOR MANUFACTURING AN APERTURE SURROUNDING FRAME FOR AN AIRCRAFT FUSELAGE, AND FRAME OBTAINED THEREOF

CROSS-REFERENCE TO RELATED APPLICATIONS

The present disclosure claims priority to European Application No. 15382543.5 filed on Nov. 5, 2015, which is hereby incorporated by reference in its entirety, as though set forth fully herein.

FIELD OF DISCLOSURE

The present disclosure refers to a manufacturing process of a surrounding frame, and in particular, a manufacturing process of a surrounding frame for an aperture of an aircraft fuselage. The aperture surrounding frame may be a window frame or a door frame for an aircraft. Also, the present disclosure refers to a forming tool and an injection tool for manufacturing an aperture surrounding frame for an aircraft fuselage.

An object of the present disclosure is to provide a manufacturing process for an aperture surrounding frame that achieves a higher productivity compared with traditional processes.

Another object of the present disclosure is simplifying the manufacturing process, at the same time that reducing the cost associated to the manufacture.

Another object of the present disclosure is to provide an aperture surrounding frame made as a continuous and unitary body, integrating all the frame's components, such that the assembly time and cost of the frame are minimized.

Another object of the invention is to provide a forming tool and an injection tool for manufacturing an aperture surrounding frame for an aircraft fuselage, which allows for use of same molds for both forming and injection to avoid complex pre-form demolding after forming.

BACKGROUND OF THE DISCLOSURE

Historically, the structural elements of large passenger aircrafts were typically made from metal. For such aircrafts, the fuselage shells were usually manufactured from high-strength aluminum alloys or similar metals.

However, along the years, the materials used in aviation have considerably evolved in order to be able to increase their resistance, while at the same time reducing their weight. With this objective, most of the aircraft manufacturers are turning to fiber-reinforced resin materials, i.e. composite materials that have relatively high strength-to-weight ratios.

Thus, nowadays, the fuselage is generally made of composite material, and although the material has a hardness, the material must be reinforced at attaching areas in the event the fuselage is someway altered or disrupted. This reinforcement is specially required at attaching areas where the wings, VTP, or HTP will be assembled to the fuselage. Also, reinforcement is required at the holes performed for allocating windows and doors for the aircraft.

Currently, different composite structures can be found on different types of aircraft with the same purpose of stiffening the holed shell of the tail section access door, but all these solutions at least imply:

reinforcing the lower fuselage around the doors by means of composite crossbeams, reinforcing the cut-out corners by means of titanium plates, joining stringers feet to outer beam flange, and placing joint elements at crossings between beams and frames.

Figure 1:
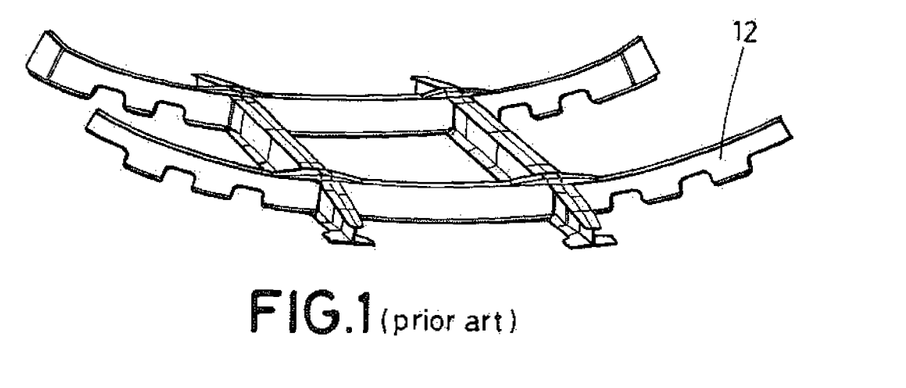
FIG. 1 shows an example of a window frame configuration according to the prior art.

FIG. 1 shows one example of the current solutions discusses above. In this solution, the door hole will be stiffened by a one-shot RTM (Resin Transfer Molded) frame (12) that includes beams, frames, and joining elements at crossings. The depicted frame (12) is configured to surround the cut-out and extend toward closed areas to be integrated with adjacent beams and frames. As shown in FIG. 1, the frame is a piece difficult to manufacture, requiring too much time and cost.

Figure 2:
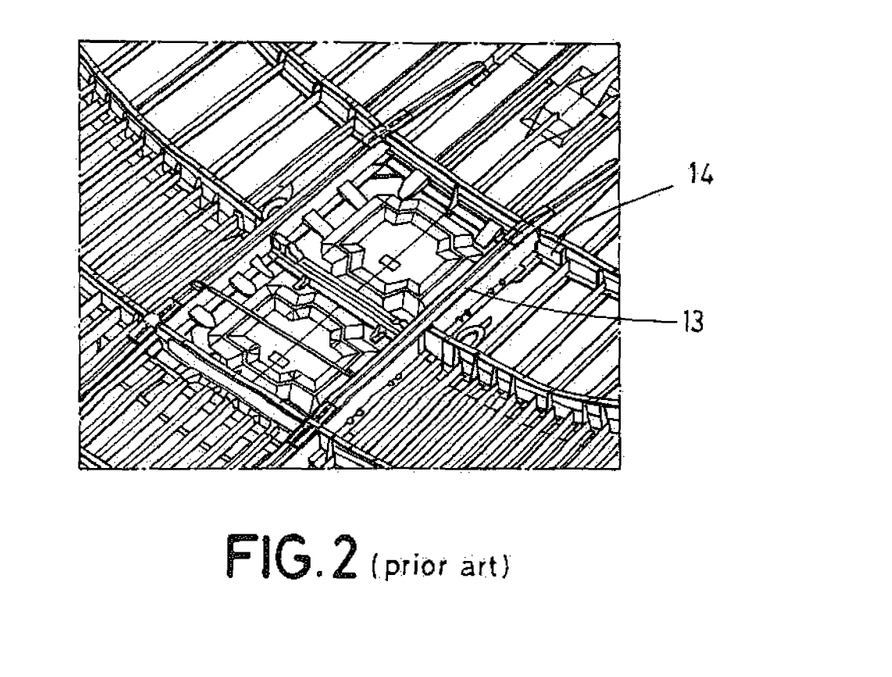
FIG. 2 shows another example of a window frame configuration according to the prior art.

FIG. 2 shows another example of the current solutions in which the door frame elements are non-integrated parts, since composite frames (13) are attached to continuous metallic beams (14). This solution carries a difficult assembling, and demands a lot of ancillary pieces that increases the time and cost of the assembly.

With respect to window frames, different solutions can be currently found. For example, one solution consists of combining different preforms (stamped plies) made of Non-Crimp Fabric (NCF) reinforced with polar patched manufactured by filament winding, while another solution is based on patterns made of Tailored Fiber Placement (TFP).

However, these currently known solutions for reinforcing the window hole are not satisfactory. The NCF solution does not offer a controlled fiber orientation, while the TFP solution is expensive and time consuming.

Therefore, there is a need, in the aeronautical industry, for a method for manufacturing an aperture surrounding frame, and a reinforcing surrounding frame for a hole of an aircraft fuselage, which is able to simplify and reduce the time conventionally required for obtaining this aperture reinforcement surrounding frames.

SUMMARY OF THE DISCLOSURE

The present discloses overcomes the above mentioned drawbacks by providing a method for manufacturing a skin hole reinforcing frame that simplifies the manufacture of surrounding frames, such as window or door frames, and reduces the time and cost associated to said manufacture. Also, the present disclosure provides a simplified and economic skin hole surrounding reinforcement which can be easily assembled to the fuselage.

An aspect of the present disclosure refers to a method for manufacturing an aperture surrounding frame for an aircraft fuselage, wherein, first, a tubular braiding material having a perimeter equal to the perimeter of the aperture surrounding frame to be manufactured is provided. Then, the tubular braiding material is transversely cut to obtain at least one annular-shaped braiding slice. Following, an annular-shaped inner mold is provided, wherein the inner mold has a surface having a desired shape for the aperture surrounding frame. Then, at least one braiding slice is layered up around the inner mold. Following, the at least one braiding slice around the inner mold is hot-formed to obtain an aperture surrounding frame pre-form, and finally, the aperture surrounding frame pre-form is cured to obtain a cured composite aperture surrounding frame.

Another aspect of the present disclosure includes a frame with a continuous perimeter by providing a tubular braiding material with a perimeter equal to the perimeter of the aperture surrounding frame to be manufactured from as a single and unitary body.

This way, the present disclosure simplifies the manufacturing process and avoids the process of joining pieces to form the frame. Also, the present disclosure ensures same strengthen and behavior along the entire contour of the frame, since the frame has no disruption along the frame's contour.

Moreover, the present disclosure allows the process to be easily adapted to manufacture different aperture surrounding frames by just changing the dimensions of the tubular braiding material. Thus, the present disclosure additionally offers a versatile solution, since the manufacturing process can be used to manufacture either a door frame or a window frame by only modifying the perimeter of the tubular braiding material.

Once the tubular braiding material is provided, the present disclosure contemplates cutting transversely the tubular braiding material to obtain at least one annular-shaped braiding slice. Each slice has a continuous a single body of braiding material, thus, as mentioned, the present disclosure ensures the continuity along the perimeter of the frame, and avoids the weakness and other drawbacks associated to joined pieces.

Additionally, at this step, the present disclosure allows for obtaining frames with perimeters of variable height by modifying the size of the braiding slices.

For the forming, the present disclosure provides an annular-shaped inner mold comprising a surface having the desired shape for the aperture surrounding frame. Thus, layering up at least one braiding slice around the inner mold, the at least one braiding slice can be hot-formed to obtain an aperture surrounding frame pre-form.

Finally, the aperture surrounding frame pre-form is cured to obtain a cured composite aperture surrounding frame.

Another aspect of the present disclosure refers to an aperture surrounding frame for an aircraft fuselage obtained by forming and curing an aperture surrounding frame pre-form from at least one annular-shaped braiding slice, wherein the braiding slice has a perimeter equal to the perimeter of the aperture surrounding frame.

The aperture surrounding frame is obtained by a simplifier manufacturing method, which at the same time allows reducing the time and cost required for manufacture.

Preferably, in one aspect the aperture surrounding frame is a window frame, or alternatively, a door frame.

Another aspect of the present disclosure refers to a forming tool for manufacturing an aperture surrounding frame for an aircraft fuselage, where the forming tool includes an inner mold, a membrane, and a lower top and an upper top. The inner mold is annular-shaped, and has an outer surface with a central section positioned between an upper section and a lower section. The central section protrudes from the upper and the lower section. The lower top and upper top each have a diameter larger than the diameter of the inner mold.

Finally, another aspect of the present disclosure refers to an injection tool for manufacturing an aperture surrounding frame for an aircraft fuselage, where the injection tool includes an inner mold, an exterior mold, a male plate, and a female plate. The inner mold is annular-shaped and has an outer surface with a central section positioned between an upper and a lower section. The central section protrudes from the upper section and the lower section. The exterior mold is configured to at least outwardly enclose the inner mold. The male plate is configured to support the inner mold. The female plate is configured to receive the exterior mold and to match with the male plate to form a closed injection tool, which is suitable for receiving resin for performing a resin impregnating process.

The forming tool and injection tool are versatile tools as the tools allow for use of the same inner mold for forming and injection and the tools avoid causing defects on the aperture surrounding frame pre-form demolding. The pre-form demolding after forming is no longer needed, if the forming tool and injection tool are used in a manufacturing process.

BRIEF DESCRIPTION OF THE FIGURES

For a better comprehension of the invention, the following drawings are provided for illustrative and non-limiting purposes, wherein:

FIGS. 5A, 5B, and 5C are a schematic illustration of images corresponding to the hot-forming step in an accordance with an aspect of the present disclosure. Specifically.

FIGS. 6A and 6B show examples of different views of the membrane assembly enclosing at least one braiding slice layered around the inner mold, where the membrane assembly includes a membrane, an upper top, and a lower top, in accordance with an aspect of the present disclosure. Specifically.

FIGS. 8A and 8B shows various views of an injection tool for manufacturing an aperture surrounding frame for an aircraft fuselage in accordance with an aspect of the present disclosure. In particular.

DETAILED DESCRIPTION OF THE PRESENT DISCLOSURE

Figure 3:
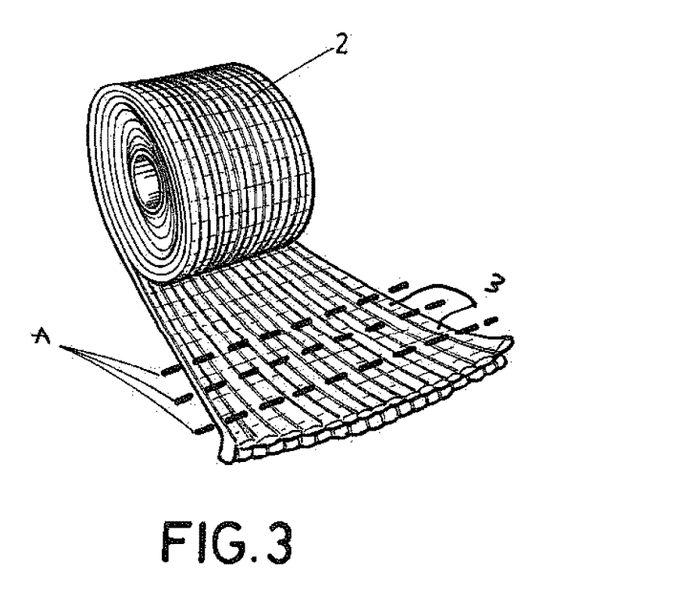
FIG. 3 shows an example of a roll of tubular braiding material with cutting lines for obtaining the annular-shaped braiding slices in accordance with an aspect of the present disclosure.

FIG. 3 shows a roll of braiding material 2 in accordance with an aspect of the present disclosure. According to the present disclosure, the roll has a perimeter that is equal to the perimeter of the aperture surrounding frame to be manufactured. Thus, the frame will have no discontinuities that could affect its consistency.

Afterwards, the roll of braiding material 2 is transversely cut along the cutting lines A illustrated in FIG. 3 to obtain braiding slices 3. Each slice 3 has an annular-shaped due to the tubular condition of the braiding material 2. As mentioned, the annular-shaped slice provides continuity and homogeneity to the potential aperture surrounding frame, at the same time the annular-shaped slice enhances the frame's strength by avoiding the weakness of the bonding areas.

Figure 4A:
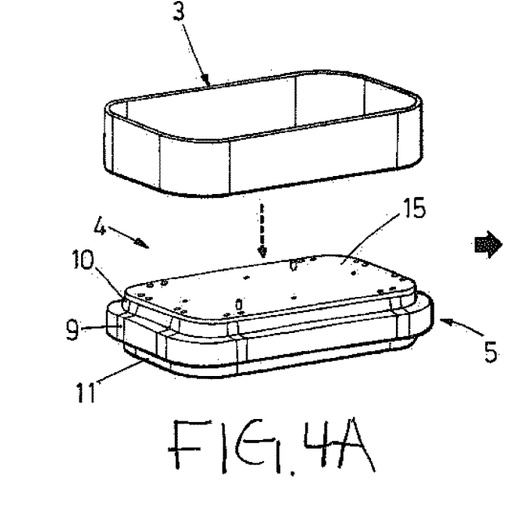
FIGS. 4A and 4B is a schematic illustration of images of an annular-shaped braiding slice, an annular-shaped inner mold used for the forming, and the braiding slice layered up around the inner mold in accordance with an aspect of the present disclosure.
Figure 4B:
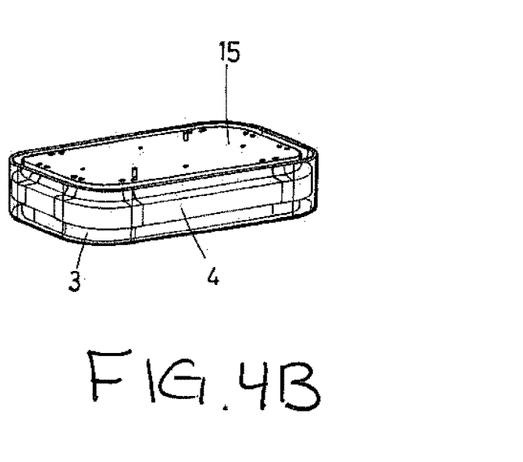

Once the annular-shaped braiding slice 3 is obtained, the slice 3 is layered around an inner mold 4. FIG. 4A shows a braiding slice 3, an inner mold 4, and the braiding slice 3 layered around the inner mold 4.

The layering step can involve one braiding slice 3. However, to obtain a pile of plies, the layering step will generally involve more than one braiding slice 3 that will be coaxially disposed around the inner mold 4.

The inner mold 4 includes a surface 5 having the desired shape for the aperture surrounding frame. Preferably, the surface 5 is an outer surface of the inner mold 4 that has a central section 9 that protrudes with respect to an upper section 10 and a lower section 11.

Preferentially, the inner mold 4 is further provided with an auxiliary plate 15 configured to be received by the annular-shaped inner mold 4 to fully complete the inside space of the inner mold 4.

Following the layering step, the annular-shaped braiding slice 3 is hot-formed to obtain an aperture surrounding frame pre-form.

According to a preferred aspect, the step of forming the at least one braiding slice 3 around the inner mold 4 further includes the steps of enclosing the at least one braiding slice 3 layered around the inner mold 4 by a membrane assembly, applying heat and vacuum inside the membrane assembly to conform the aperture surrounding frame pre-form, and removing the membrane assembly.

Preferably, the membrane assembly includes a membrane 8, a lower top 6, and an upper top 7 for covering the inner module 4. The lower and upper tops 6, 7 have a diameter larger than the diameter of the inner mold 4 such that the tops 6, 7 project around the braiding slice 3 layered around the inner mold 4. This way, the membrane 8 is positioned easily.

Figure 5A:
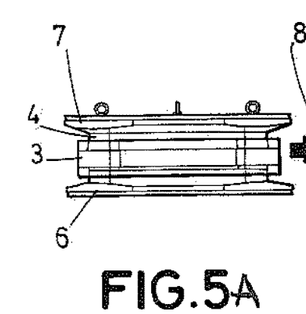
FIG. 5A shows the braiding slice layered around an inner mold, with an upper top and a lower top arranged above and below of the inner mold.

Once the membrane assembly is provided, the lower top 6 is arranged below the inner mold 4, and the upper top 7 above the inner mold 4. FIG. 5A shows the braiding slice 3 layered around the inner mold 4 with the lower top 6 and the upper top 7 placed at both sides of the inner mold 4.

Figure 5B:
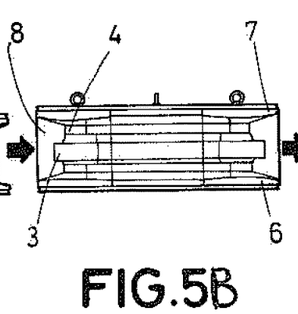
FIG. 5B shows a membrane extending from the upper top up to the lower top.

Then, as shown in FIG. 5B, the membrane 8 is disposed over one of the lower top 6 and the upper top 7 and extends over at least an inner surface of the other top for entirely covering the at least one braiding slice 3. For example, as shown in FIG. 5B, the membrane 8 is disposed over one of the upper top 7 and extends over the inner surface of the other lower top 6.

Figure 5C:
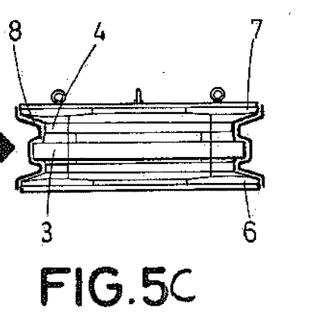
FIG. 5C shows the result once the heat and vacuum has been applied inside the membrane.

After, the membrane 8 is fixed to the lower top 6 to ensure the membrane's position. Afterwards, heat and vacuum is applied inside the membrane 8 to conform the aperture surrounding frame pre-form, showed in FIG. 5C.

Preferably, the membrane 8 has a hat-shaped profile includes an elevated central part, two webs, and side flanges. The elevated central part has a diameter larger than the diameter of one of the lower top 6 and the upper top 7 to cover one of lower top 6 and the upper top 7. The two webs have a length that extends along the outer contour of the inner mold 4, the outer contour has the desired shape for the aperture surrounding frame. The side flanges project orthogonally with respect to the two webs to allow for fixing of the membrane 8 to the inner surface of the lower top 6 to secure the membrane's position. With this shape, the membrane 8 is easily positioned over the inner mold 4, and is also fixed to the other top.

Figure 6A:
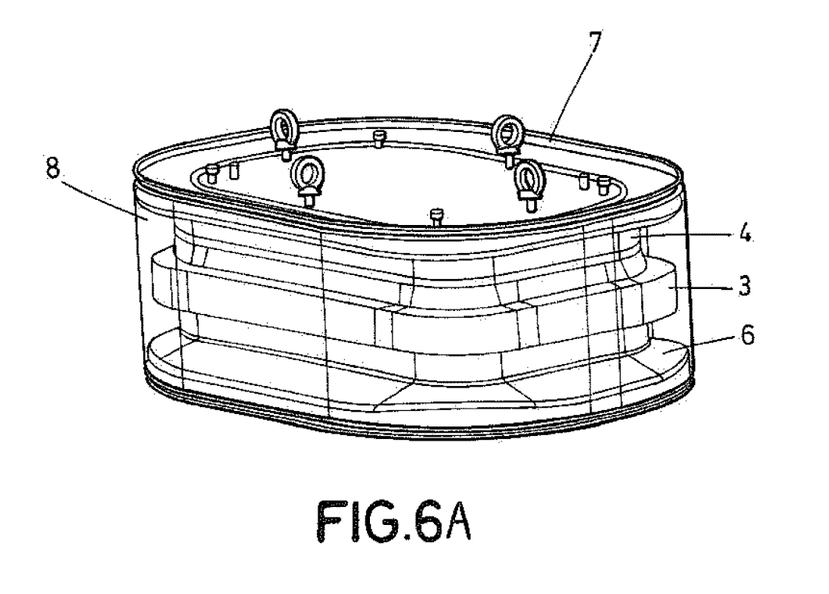
FIG. 6A shows a perspective view and FIG. 6B shows a plan view.
Figure 6B:
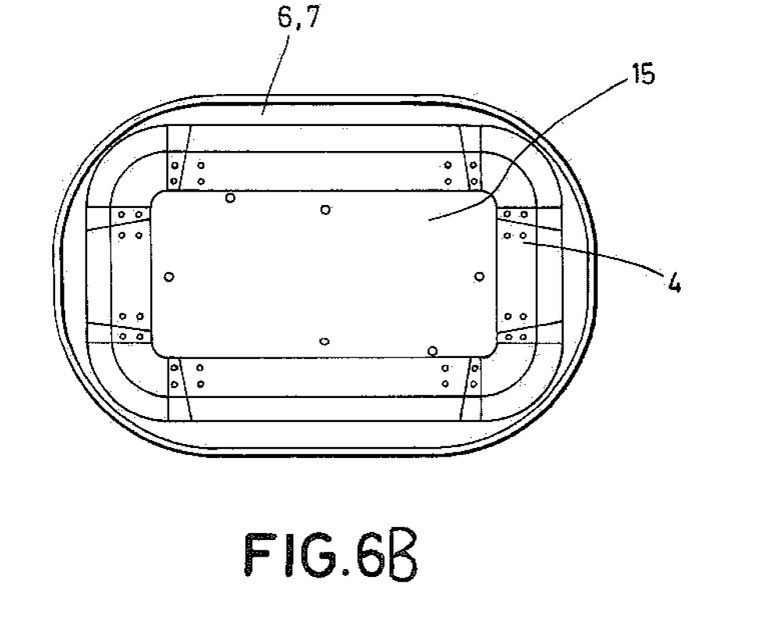

FIG. 6A shows a more detailed perspective view of the membrane assembly enclosing the at least one braiding slice 3 layered around the inner mold 4, where the membrane assembly comprises a membrane 8, an upper top 7, and a lower top 6. FIG. 6B shows a respective plan view of the membrane assembly of FIG. 6A.

Preferably, the inner mold 4 has an elliptical configuration with a central region and two extreme regions, and the step of enclosing the at least one braiding slice 3 by the membrane assembly further comprises providing auxiliary pieces at the extreme regions of the inner mold 4 to reduce the distance to the lower top 6 and the upper top 7 at these extreme regions, to ensure plies adaptability from the extremes to the central region of the inner mold 4. This way, the present disclosure ensures correct plies adaptability promoted from the extremes to the straight area of the inner mold to avoid wrinkles appearance. Additionally, and contrary to the current solution where certain fiber distortion occurs on flanges due to geometry evolution on corners, the present disclosure offers that fiber orientation is fully kept on the aperture surrounding frame pre-form web thanks to the proposed process.

Once the aperture surrounding frame pre-form is obtained during forming, the aperture surrounding frame pre-form is cured to obtain the cured composite aperture surrounding frame.

Preferably, the braiding material includes a braid of dry carbon fibers, and the step of curing comprises providing an upper exterior mold 17, a male plate 16, and a female plate 18, arranging the male plate 6 below the inner mold 4, and the exterior mold 17 and the female plate 18 above the inner mold 4 to form a closed injection tool 19, and impregnating the dry fiber inside the closed injection tool 19 by a resin impregnating process. The exterior mold 17 is configured to at least outwardly enclose the inner mold 4 to embrace the aperture surrounding frame pre-form 1, which is layered around the inner mold 4. The male plate 16 is configured to support the inner mold 4. And the female plate 18 is configured to receive the exterior mold 17 and to match with the male plate 16.

According to a preferred aspect, impregnating the dry fiber is carried out by a Resin Transfer Molding (RTM) process.

Figure 7:
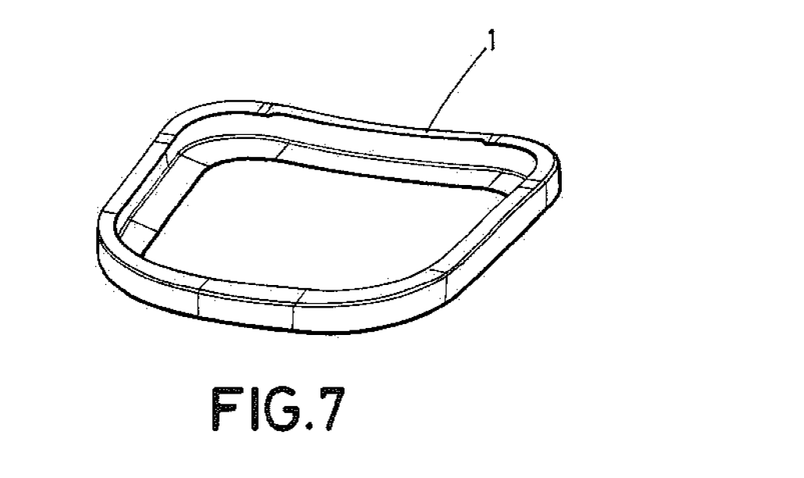
FIG. 7 shows an aperture surrounding frame pre-form in accordance with an aspect of the present disclosure.

FIG. 7 shows an aperture surrounding frame 1 for an aircraft fuselage where the aperture surrounding frame 1 is obtained by forming and curing an aperture surrounding frame pre-form from at least one annular-shaped braiding slice 3, where the braiding slice 3 has a perimeter equal to the perimeter of the aperture surrounding frame 1.

Preferably, the aperture surrounding frame 1 will be a window frame, and alternatively, a door frame.

The present disclosure provides a simplified and more productive manufacturing process by providing a tubular braiding material with a perimeter similar to the perimeter of the aperture surrounding frame to be manufactured. The tubular braiding material only has to be cut to obtain the annular-shaped braiding slice, which will be used to conform the aperture surrounding frame. This way, the present disclosure enables obtaining aperture surrounding frames more quickly with respect to the prior art, in particular, with respect to the conventional TFP or NCF.

Moreover, the braiding material allows offering a closed and homogeneous structure, simplifying the manufacture and providing a frame improved frame in terms of strength and robustness.

Further, it has to be noted that the aperture surrounding frame manufacture only requires one mold, since the forming and the injection steps are performed over the same tool. This further simplifies the manufacturing process, by avoiding the demolding step, which can be tedious and long lasting. Also, the process saves costs, since only one mold is need.

Regarding the aperture surrounding frame and comparing to the prior art aperture surrounding frame (door frame) of FIG. 1, the present disclosure achieves to obtain a dedicated structure that minimizes the impact on aperture surrounding elements, at the same time that simplifies the complexity of the frame. With respect to FIG. 1, twenty-six preforms plus several rovings with different length and geometry could be replaced by one single preform, as shown in FIG. 7.

Considering the prior art solutions for window frames manufacturing, it has to be noted that in comparison with the NCF solution, the aperture surrounding frame of the present disclosure allows keeping fiber orientation along the frame, and in comparison with the TFP solution, the aperture surrounding frame of the present disclosure requires less cost and time for obtaining the frame.

Figure 8A:
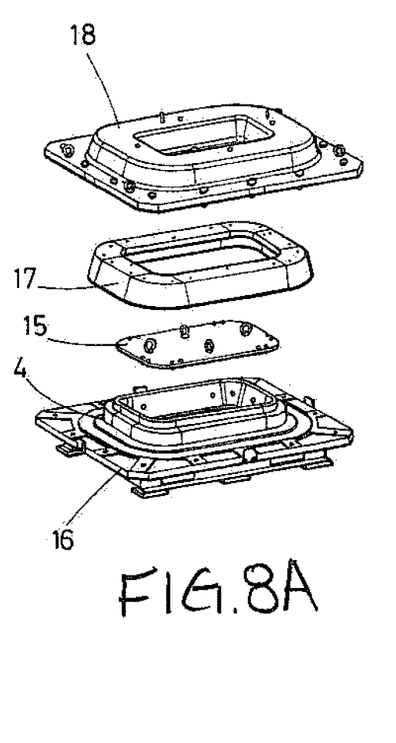
FIG. 8A shows an exploded view of an injection tool and FIG. 8B shows a perspective view of the injection tool completely assembled.
Figure 8B:
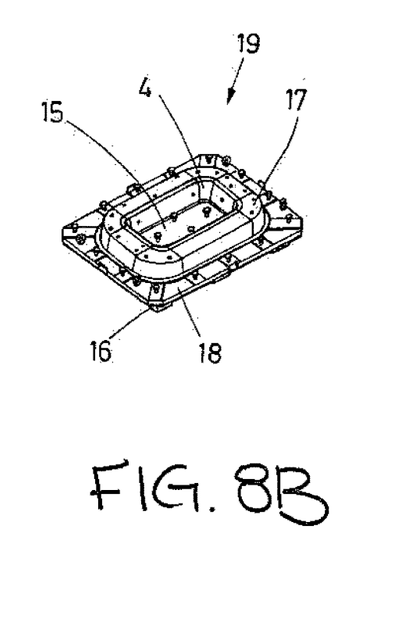

FIGS. 8A and 8B shows an exploded view of said injection tool 19. As shown, the injection tool 19 has a male plate 16, the inner mold 4, the auxiliary plate 15, an exterior mold 17, and a female plate 18.

The inner mold 4 and the auxiliary plate 15 are used for both the forming and injection step. Thus, the present disclosure avoids the aperture surrounding frame pre-form demolding, which could damage the preforms. At the same time, the present disclosure simplifies the manufacturing process, and saves time and costs by the reusing pieces.

As mentioned above, the inner mold 4 has an annular-shaped and has an outer surface 5 with a central section 9 positioned between an upper section 10 and a lower section 11. The central section 9 protrudes from the upper 10 and the lower section 11.

The male plate 16 is configured to support the inner mold 4. The exterior mold 17 is configured to at least outwardly enclose the inner mold 4 to embrace the aperture surrounding frame pre-form 1, which is layered around the inner mold 4. Additionally, the female plate 18 is configured to receive the exterior mold 17 and to match with the male plate 16 to form a closed injection tool 19 suitable for receiving resin for performing a resin impregnating process.

What is claimed:

1. A method for manufacturing an aperture surrounding frame (1) for an aircraft fuselage, the method comprising the steps of:
   providing a tubular braiding material (2) having a perimeter equal to a perimeter of the aperture surrounding frame (1) to be manufactured,
   cutting the tubular braiding material (2) transversely to obtain at least one annular-shaped braiding slice (3),
   providing an annular-shaped inner mold (4), the inner mold (4) includes a surface (5) having a desired shape for the aperture surrounding frame (1),
   layering at least one braiding slice (3) around the inner mold (4),
   forming the at least one braiding slice (3) around the inner mold (4) to obtain an aperture surrounding frame pre-form, and
   curing the aperture surrounding frame pre-form to obtain a cured composite of the aperture surrounding frame (1).

2. The method according to claim 1, wherein forming the at least one braiding slice (3) around the inner mold (4) further comprises the steps of:
   enclosing the at least one braiding slice (3) layered around the inner mold (4) by a membrane assembly,
   applying heat and vacuum inside the membrane assembly to conform the aperture surrounding frame pre-form, and
   removing the membrane assembly.

3. The method according to claim 2, wherein enclosing the at least one braiding slice (3) by the membrane assembly further comprises the steps of:
   providing a membrane (8), a lower top (6) and an upper top (7), wherein the lower top (6) and the upper top (7) have a diameter larger than the diameter of the inner mold (4),
   arranging the lower top (6) below the inner mold (4), and the upper top (7) above the inner mold (4),
   providing the membrane (8) over one of the lower top (6) and the upper top (7) extending over at least an inner surface of the other top for entirely covering the at least one braiding slice (3), and
   fixing the membrane (8) to the top whose inner surface is at least covered by the membrane (8) to secure the membrane's position.

4. The method according to claim 3, wherein the inner mold (4) has an elliptical configuration including a central region and two extreme regions, and wherein the step of enclosing the at least one braiding slice (3) by the membrane assembly further comprises:
   providing auxiliary pieces at the extreme regions of the inner mold (4) to reduce the distance to the lower top (6) and the upper top (7) at these extreme regions, to ensure plies adaptability from the extremes to the central region of the inner mold (4).

5. The method according claim 3 wherein the membrane (8) has a hat-shaped profile including an elevated central part, two webs, and side flanges, wherein the central part has a diameter larger than the diameter of one of the lower and upper top (6, 7), wherein the webs have a length so as to extend along the surface (5) of the inner mold (4) with the desired shape, and wherein the side flanges orthogonally project with respect to the webs to allow for fixing the membrane to one of the lower top (6) and upper top (7) to thereby secure the membrane's position.

6. The method according to claim 1, wherein the braiding material is dry fiber, and the step of curing the aperture surrounding frame pre-form further comprises:
   providing an exterior mold (17), a male plate (16), and a female plate (18), the exterior mold (17) being configured to at least outwardly enclose the inner mold (4), the male plate (16) being configured to support the inner mold (4), and the female plate (18) being configured to receive the exterior mold (17) and match with the male plate (16),
   arranging the male plate (6) below the inner mold (4), and the exterior mold (17) and the female plate (18) above the inner mold (4) to form a closed injection tool (19), and impregnating the dry fiber inside the closed injection tool (19) by a resin impregnating process.

7. The method according to claim 6, wherein the step of impregnating the dry fiber is carried out by a Resin Transfer Molding (RTM) process.

8. The method according to claim 1, wherein laying up the braiding slice (3) is coaxially performed around the inner mold (4).

9. The method according to claim 1, wherein the annular-shaped inner mold (4) has an outer surface (5) with a central section (9) protruding with respect to an upper (10) and a lower section (11) to provide the desired shape to the aperture surrounding frame (1).

10. The method according to claim 1, wherein the braiding material comprises a braid of dry carbon fibers.

* * * * *